United States Patent [19]

Chen

[11] Patent Number: 5,076,003

[45] Date of Patent: Dec. 31, 1991

[54] LIGHT DEVICE FOR AN ARTIFICIAL FISHING LURE

[76] Inventor: Yung-Huang Chen, Fl., 2, No. 15, Lane 18, Sec. 4, Chung-Yang N. Rd., Peitou Dist., Taipei City, Taiwan

[21] Appl. No.: 673,674

[22] Filed: Mar. 22, 1991

[51] Int. Cl.$^5$ .............................. A01K 85/00
[52] U.S. Cl. .................... 43/17.5; 43/42.33
[58] Field of Search ............... 43/17.5, 17.6, 17.1, 43/42.33, 42.34, 42.35; 313/498, 512, 110; 362/800

[56] References Cited

U.S. PATENT DOCUMENTS

| | | | |
|---|---|---|---|
| 2,127,761 | 8/1938 | Beck | 43/42.33 |
| 2,309,521 | 1/1943 | Mabee | 43/42.33 |
| 3,969,839 | 7/1976 | Ziegler | 43/17.6 |
| 4,195,330 | 3/1980 | Savage, Jr. | 362/800 |
| 4,291,484 | 9/1981 | Young | 43/17.5 |
| 4,426,803 | 1/1984 | Helling | 43/17.6 |
| 4,967,330 | 10/1990 | Bell et al. | 362/800 |

Primary Examiner—Kurt Rowan
Assistant Examiner—Chuck Y. Mah
Attorney, Agent, or Firm—Ladas & Parry

[57] ABSTRACT

A light device for an artificial fishing lure includes a housing having an elongated transparent tubular portion, a reflector plate disposed on one end of the transparent tubular portion, and a chamber disposed adjacent to the other end of the transparent tubular portion. The housing is to be attached to the artificial fishing lure. An electrical light emitting device is provided inside the housing adjacent to the other end of the transparent tubular portion. A power source is disposed inside the chamber and supplies electric power to the electrical light emitting device so as to operate the same. The tubular portion has an inner surface provided with a plurality of axially extending triangular notches. Refraction of light rays passing through the transparent tubular portion is increased by the triangular notches.

10 Claims, 4 Drawing Sheets

LIGHT DEVICE FOR AN ARTIFICIAL FISHING LURE

BACKGROUND OF THE INVENTION

1. Field Of The Invention

The invention relates to a light device, more particularly to a light device to be incorporated in an artificial fishing lure to facilitate fishing during nighttime.

2. Description Of The Related Art

Presently, fluorescent sticks are used to provide adequate lighting to attract fish during nighttime fishing. The disadvantages of using fluorescent sticks for this purpose are as follows:

1. The intensity of light output by fluorescent sticks is relatively low. The useful life of the fluorescent sticks is also short since its light output becomes insufficient after 2 to 3 hours of use.
2. Fluorescent sticks are coated with chemical substances which pollute the environment.
3. The light output of fluorescent sticks is also affected by storage conditions such as shelf life and humidity.
4. Fluorescent sticks are wasteful since they can only be used once.

SUMMARY OF THE INVENTION

Therefore, the main objective of the present invention is to provide a light device to be incorporated in an artificial lure to facilitate fishing during nighttime, which light device overcomes the drawbacks commonly associated with conventional fluorescent sticks.

More specifically, the objective of the present invention is to provide an electrically powered light device for an artificial fishing lure, said light device having a strong light output, a visibility range of up to 100 meters, a longer useful life, and does not use chemical pollutants.

Accordingly, the preferred embodiment of a light device for an artificial fishing lure, of the present invention comprises: a housing, to be attached to the artificial fishing lure, including an elongated transparent tubular portion having an inner surface provided with a plurality of axially extending triangular notches and a knurled outer surface, a reflector plate disposed on one end of the transparent tubular portion, and a chamber disposed adjacent to the other end of the transparent tubular portion; an electrical light emitting means including a light emitting diode provided inside the housing adjacent to the other end of the transparent tubular portion; and a button cell means disposed inside the chamber to supply electric power to the electrical light emitting means. Refraction of light rays passing through the transparent tubular portion is increased by the triangular notches to achieve a unique lighting effect.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
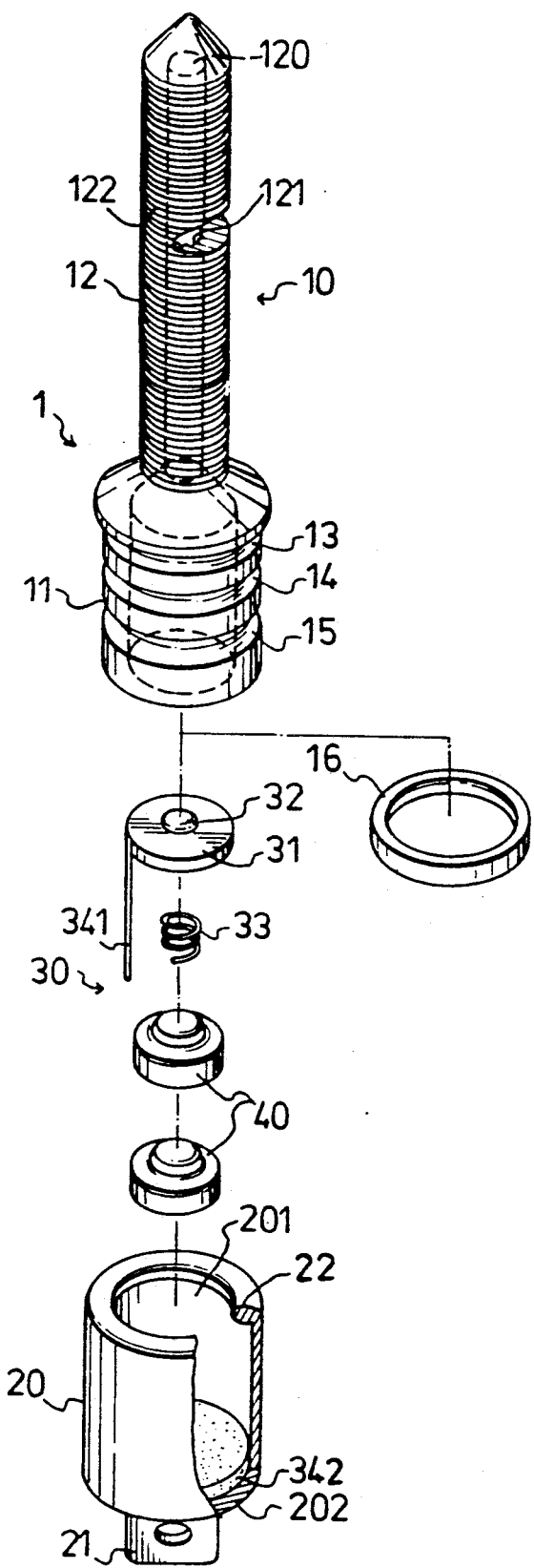
FIG. 1 is an exploded view of the first preferred embodiment of a light device according to the present invention.
Figure 3:
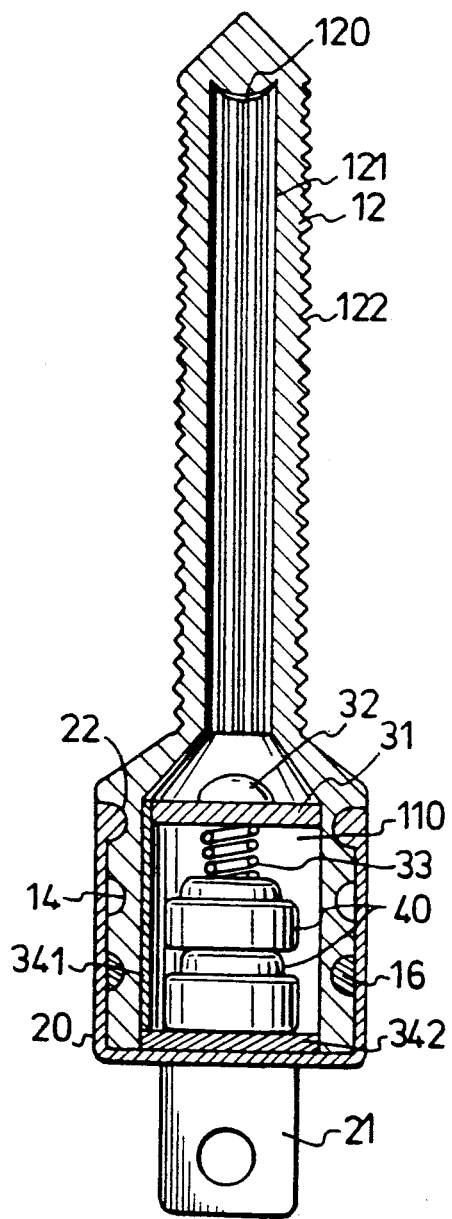
FIG. 3 is a sectional view of the first preferred embodiment to illustrate its assembly.

Referring to FIGS. 1 and 3, the first preferred embodiment of a light device 1, to be incorporated in an artificial fishing lure, according to the present invention is shown to comprise a housing which includes a first casing 10 and a second casing 20, and an electrical means 30.

Figure 2:
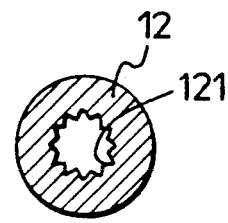
FIG. 2 is a sectional view of a tubular portion of a housing of the first preferred embodiment.

The first casing 10 has a cylindrical base portion 11 and a transparent tubular portion 12 extending upwardly from the base portion 11. The base portion 11 is wider than the tubular portion 12. A reflector plate 120 is disposed inside the tubular portion 12 at one end thereof, distal from the base portion 11. The inner surface of the tubular portion 12 is provided with a plurality of axially extending triangular notches 121, as shown in FIG. 2, to increase the refraction of light rays passing through the tubular portion 12. The tubular portion 12 has a knurled outer surface 122. The outer surface of the base portion 11 is provided with three annular recesses 13, 14 and 15. The lowermost annular recess 15 receives a sealing ring 16.

Figure 6:
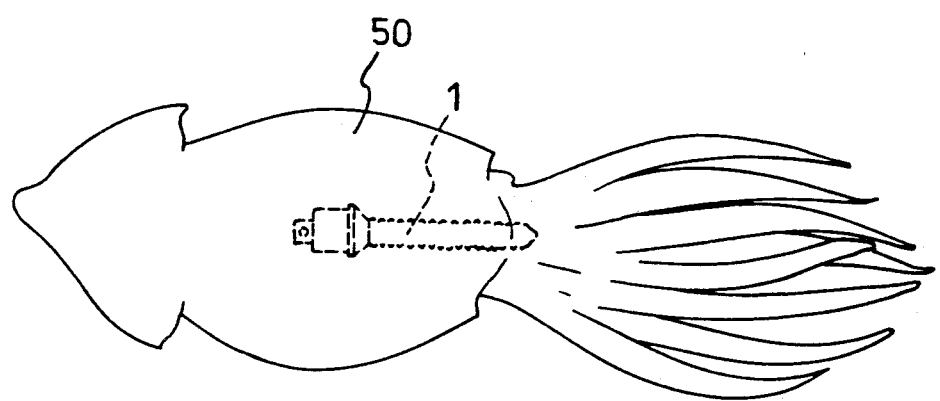
FIG. 6 is an illustration of the light device of the present invention when incorporated in an artificial fishing lure.

The second casing 20 is a hollow cylinder having an open first end 201 and closed second end 202. The second casing 20 has a connector piece 21 extending outward from the closed second end 202, to which an artificial fishing lure 50 can be attached, as shown in FIG. 6. The second casing 20 is to be sleeved over the base portion 11 of the first casing 10 and has an annular flange 22 projecting inward from the open first end 201 and selectively engaging one of the annular recesses, 13 or 14. The first and second casings, 10 and 20, cooperatively confine a chamber 110 disposed adjacent to the tubular portion 12.

Figures 4, 5:
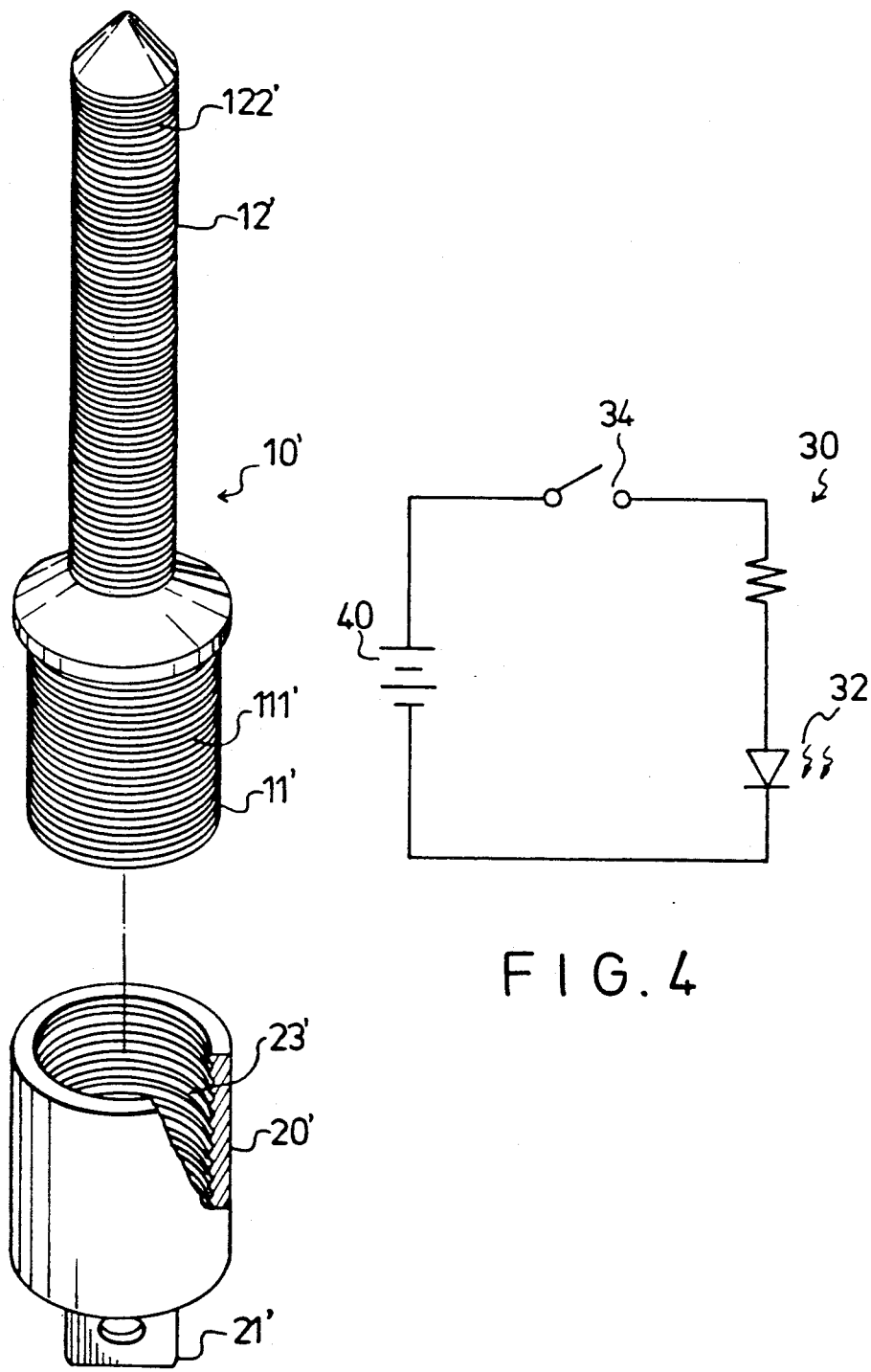
FIG. 4 is a schematic circuit diagram of an electrical means of the first preferred embodiment.
FIG. 5 is an exploded view of a housing of the second preferred embodiment of a light device according to the present invention.

The electrical means 30, a schematic circuit diagram of which is shown in FIG. 4, includes a circuit board 31 mounted inside the base portion 11 at one end of the chamber 110 adjacent to the tubular portion 12. A light emitting diode (LED) 32 is disposed on one side of the circuit board 31 adjacent to the tubular portion 12. One terminal end of the LED 32 is electrically connected to a spring 33 mounted on the other side of the circuit board 31. A switching means 34 of the electrical means 30 includes first and second electrical conductors, 341 and 342. The first electrical conductor 341 extends from the open first end 201 to the closed second end 202 of the second casing 20, and is electrically connected to the other terminal end of the LED 32. The second electrical conductor 342 is flatly disposed on the closed second end 202 of the second casing 20.

A pair of button cells 40 is used to supply the required electrical power to the electrical means 20. The button cells 40 are connected in series and are disposed in the chamber 110. The spring 23 is electrically connected to one of the terminal ends of the button cells 40 to electrically connect said one terminal end of the LED 32 to the button cells 40. The other terminal end of the button cells 40 is electrically connected to the second electrical conductor 242. Engagement of the annular flange 22 of the second casing 20 with the annular recess 13 of the first casing 10 establishes electrical connection between the first and second electrical conductors, 341 and 342, to thereby create a closed circuit condition and cause the LED 32 to glow. Light radiated by the LED 32 is reflected by the reflector plate 120 and is refracted by the triangular notches 121 before being radiated through the knurled outer surface 122 of the first casing 10, thus achieving a unique lighting effect.

When the light device of the present invention is not in use, the second casing 20 is pulled away from the first casing 10 to permit engagement of the annular flange 22 with the annular recess 14. This causes the first and second electrical conductors, 341 and 342, to break electrical connection and stop the supply of electric power to the LED 32. The electrical power consumption of the LED 32 is relatively small. The button cells 40 can thus continuously operate the LED 32 for more than 30 hours before any replacement is needed. This illustrates the economical advantages of using the present invention.

When the first casing 10 engages the second casing 20, the sealing ring 16 prevents entry of liquid into the chamber 110, thereby protecting the electrical means 30 from damage.

Referring to FIG. 5, the second preferred embodiment of a light device according to the present invention is shown to comprise a first casing 10' having a cylindrical base portion 11' provided with external threads 111' which engage internal threads 23 of a hollow cylindrical second casing 20'. The operation of the second preferred embodiment is substantially similar to that of the first preferred embodiment. The second casing 20' is rotated in a first direction relative to the first casing 10' to electrically connect the first and second electrical conductors, 341 and 342, and in the opposite direction to break electrical connection between the first and second electrical conductors, 341 and 342.

Referring once more to FIG. 6, the light device 1 of the present invention may be incorporated in any type of artificial fishing lure 50 (such as artificial shrimps, squids, or small fish), and is more effective than the conventionally used fluorescent sticks.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A fishing assembly including an artificial fishing lure and light device, said light device comprising:
    a housing including an elongated transparent tubular portion, a reflector plate disposed on one end of said transparent tubular portion, and a chamber disposed adjacent to the other end of said transparent tubular portion, said tubular portion having an inner surface provided with a plurality of axially extending triangular notches, said housing to be attached to the artificial fishing lure;
    an electrical light emitting means provided inside said housing adjacent to the other end of said transparent tubular portion; and
    a cell means disposed inside said chamber to supply electric power to said electrical light emitting means so as to operate said electrical light emitting means;
    whereby, refraction of light rays passing through said transparent tubular portion is increased by said triangular notches.

2. The light device as claimed in claim 1, wherein said transparent tubular portion has a knurled outer surface.

3. The light device as claimed in claim 1, wherein said housing further comprises a first casing and a cylindrical second casing having an open first end and a closed second end, said first casing having a cylindrical base portion, said transparent tubular portion extending upward from said cylindrical base portion, said cylindrical base portion detachably engaging said cylindrical second casing, said cylindrical base portion and said cylindrical second casing cooperatively confining said chamber.

4. The light device as claimed in claim 3, wherein said cell means is a button cell.

5. The light device as claimed in claim 3, wherein said cylindrical base portion has a diameter wider than that of said transparent tubular portion, and said electrical light emitting means comprises:
    a circuit board mounted inside said cylindrical base portion at one end of said chamber adjacent to said transparent tubular portion;
    an electrical light source mounted on one side of said circuit board adjacent to said transparent tubular portion, said electrical light source having first and second terminal ends, said first terminal end being electrically connected to said cell means;
    a first electrical conductor extending from said open first end to said closed second end of said cylindrical second casing, said first electrical conductor being electrically connected to said second terminal end of said electrical light source; and
    a second electrical conductor provided on said closed second end of said cylindrical second casing and electrically connected to said cell means, said second electrical conductor being selectively electrically connected to said first electrical conductor to form a closed circuit condition.

6. The light device as claimed in claim 5, wherein said electrical light emitting means further comprises a spring mounted on the other side of said circuit board and having one end electrically connected to said first terminal end of said electrical light source, the other end of said spring being electrically connected to said cell means.

7. The light device as claimed in claim 5, wherein said electrical light source is a light emitting diode.

8. The light device as claimed in claim 5, wherein said cylindrical base portion has an outer surface provided with a first annular recess and a second annular recess disposed between said first annular recess and said transparent tubular portion, said cylindrical second casing having an open end provided with an inwardly projecting annular flange selectively engaging one of said first and said second annular recesses, engagement of said annular flange with said first annular recess breaking electrical connection between said first and said second electrical conductors, engagement of said annular flange with said second annular recess electrically connecting said first and said second electrical conductors to form the closed circuit condition.

9. The light device as claimed in claim 8, wherein said cylindrical base portion has a third annular recess adjacent to said first annular recess and opposite said second annular recess, said light device further comprises a sealing ring received in said third annular recess to prevent liquid flow into said chamber.

10. The light device as claimed in claim 5, wherein said cylindrical base portion and said cylindrical second casing are threadedly engaged, said cylindrical second casing being rotated in one direction relative to said cylindrical base portion to break electrical connection between said first and said second electrical conductors, said cylindrical casing being rotated in the opposite direction relative to said cylindrical base portion to electrically connect said first and said second electrical conductors to form the closed circuit condition.

* * * * *